Patented Sept. 24, 1940

2,215,601

UNITED STATES PATENT OFFICE 2,215,601

PLASTIC COMPOSITION

Peter J. Wiezevich, Elizabeth, N. J., now by judicial change of name Peter J. Gaylor, and William J. Sparks, Cranford, N. J., assignors to Standard Oil Development Company, a corporation of Delaware No Drawing. Application May 20, 1937, Serial No. 143,758

7 Claims. (Cl. 260—13)

This invention deals with the production of novel plastic and film forming materials and more specifically, to the manufacture of clear, uniform plastics containing certain polysulfones and cellulose compounds. The invention will be understood from the following description.

Polysulfones are insoluble in most organic solvents and while some solvents can be found to dissolve them, they are usually of the types which are incompatible with plastic and film producing materials such as ethers and esters of cellulose.

It has been found that the polysulfone of allyl chloride is soluble in ketone solvents such as acetone and by means of such solvent can be brought into solution with the common cellulose compounds such as nitrate, acetate, ethers and the like. After the removal of such common solvents, as by evaporation, there is produced a homogeneous plastic composition comprising a cellulose compound and the polysulfone.

The cellulose compound employed in this invention is any cellulose ester or ether, such as cellulose acetate, nitrate, propionate, butyrate, aceto-butyrate, laurate, naphthenate, oleate, stearate, benzyl cellulose, ethyl cellulose and the like. Cellulose esters of the lower fatty acids, e. g., the acetates, are preferred.

The amount of polysulfone added to the cellulose compound may be 1%, 5%, 10%, 20% or even 50% or more, although it is preferable to maintain less than 50% in the composition. This material imparts exceptional hardness and fireproofing qualities to the mixture.

The products so prepared are highly suitable for films, wrappers, molded plastics, lacquers, paints, laminated glass, as a coating for cans, cables, paper containers, and the like. In conjunction with such compositions, other materials may be added, e. g., resins, rubbers, plasticizers, waxes, pigments, dyes, anti-oxidants, metal soaps, hydrocarbon polymers, halogenated compounds, and the like.

The following example illustrates the present invention:

20 c. c. of allyl chloride is mixed with 20 c. c. of liquid sulfur dioxide and 1 c. c. of paraldehyde as well as 1 drop of 30% hydrogen peroxide. Reaction occurs immediately and the mixture begins to boil. If desired, the mixture may be placed in a pressure flask and allowed to warm to room temperature. A white precipitate (polysulfone) is formed. The polysulfone so prepared is dissolved in acetone, precipitated with water and dried in an oven.

The dried material is again dissolved in acetone and mixed with an equal weight of high viscosity cellulose acetate in acetone until a clear solution results. The mixture is then poured on a glass plate and allowed to harden for one day. The resulting film is hard, strong and homogeneous. It may be brushed on tin-plate and dried in a non-humid atmosphere to give a clear-hard film.

This invention is not limited to any theory or mechanism of reaction, nor to any example, but only by the following claims in which the intention is to limit the invention as broadly as the prior art permits.

We claim:

1. A composition suitable for the preparation of non-inflammable films comprising 5 to 50% of allyl chloride polysulfone and 50 to 95% of cellulose acetate.

2. A homogeneous plastic composition comprising a cellulose ester of a fatty acid and the polysulfone of allyl chloride.

3. A composition according to claim 2 in which the cellulose ester is cellulose acetate.

4. The process of preparing a homogeneous plastic composition of low inflammability which comprises dissolving in a ketone a cellulose ester of a fatty acid and the polysulfone of allyl chloride, and evaporating the ketone solvent.

5. A process according to claim 4 in which the ketone used as a solvent is acetone.

6. A process according to claim 4 in which the cellulose ester is cellulose acetate.

7. The process of preparing a homogeneous plastic composition of low inflammability which comprises dissolving in acetone cellulose acetate and the polysulfone of allyl chloride, and evaporating the acetone.

PETER J. WIEZEVICH.
WILLIAM J. SPARKS.